United States Patent
Shimizu

(10) Patent No.: US 8,914,655 B2
(45) Date of Patent: Dec. 16, 2014

(54) IMAGE FORMING APPARATUS AND CONTROL METHOD

(75) Inventor: Koji Shimizu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 861 days.

(21) Appl. No.: 13/098,623

(22) Filed: May 2, 2011

(65) Prior Publication Data

US 2011/0282512 A1 Nov. 17, 2011

(30) Foreign Application Priority Data

May 12, 2010 (JP) ................................. 2010-110205

(51) Int. Cl.
| | | |
|---|---|---|
| G06F 1/32 | (2006.01) | |
| G06F 11/30 | (2006.01) | |
| G06F 1/26 | (2006.01) | |
| G06F 3/12 | (2006.01) | |
| H04N 1/00 | (2006.01) | |
| G06F 1/30 | (2006.01) | |

(52) U.S. Cl.
CPC .......... *H04N 1/00885* (2013.01); *G06F 1/3203* (2013.01); *G06F 1/263* (2013.01); *G06F 3/1234* (2013.01); *G06F 3/1229* (2013.01); *H04N 1/00891* (2013.01); *Y02B 60/1271* (2013.01); *Y02B 60/1267* (2013.01); *G06F 1/30* (2013.01); *G06F 3/1221* (2013.01); *H04N 1/00896* (2013.01); *H04N 1/00901* (2013.01); *G06F 3/121* (2013.01); *H04N 2201/0094* (2013.01)
USPC ........... 713/320; 713/300; 713/323; 713/324; 713/340

(58) Field of Classification Search
None
See application file for complete search history.

(56) References Cited

U.S. PATENT DOCUMENTS

| | | | | |
|---|---|---|---|---|
| 2005/0050388 | A1* | 3/2005 | Yashiro ........................... | 714/14 |
| 2005/0094180 | A1* | 5/2005 | Nishimoto et al. .......... | 358/1.13 |
| 2008/0209237 | A1* | 8/2008 | Kim ............................... | 713/300 |
| 2011/0282512 | A1* | 11/2011 | Shimizu ........................ | 700/297 |

FOREIGN PATENT DOCUMENTS

| | | |
|---|---|---|
| CN | 1612075 A | 5/2005 |
| CN | 2862249 Y | 1/2007 |
| CN | 101339416 A | 1/2009 |
| JP | 11-265224 A | 9/1999 |
| JP | 2002-318624 A | 10/2002 |
| JP | 2002-318624 A | 10/2002 |
| JP | 2003-223122 A | 8/2003 |
| JP | 2004-038331 A | 2/2004 |
| JP | 2005-078197 A | 3/2005 |
| JP | 2005-078197 A | 3/2005 |
| JP | 2007-025882 A | 2/2007 |

\* cited by examiner

*Primary Examiner* — Tanh Nguyen
(74) *Attorney, Agent, or Firm* — Canon USA, Inc. IP Division

(57) ABSTRACT

An image forming apparatus, which operates in a normal mode or a power saving mode, includes a user interface, a first supply unit configured to supply power in the power saving mode, a second supply unit configured to supply power in the normal mode and supply no power in the power saving mode, a detection unit configured to detect abnormality of the second supply unit, and a control unit configured to perform control to supply power from the second supply unit to the user interface when the detection unit does not detect abnormality of the second supply unit and to start power supply from the first supply unit to the user interface when the detection unit detects abnormality of the second supply unit.

12 Claims, 12 Drawing Sheets

IMAGE FORMING APPARATUS AND CONTROL METHOD

BACKGROUND OF THE INVENTION

1. Field of the Invention

The present invention relates to a method for displaying an error of an image forming apparatus and particularly error control incase of power source abnormality.

2. Description of the Related Art

In recent years, power consumption of image forming apparatuses has shown a tendency to increase. Thus, it is required to decrease the entire energy consumption by reducing the power consumption not only during operation but also in a state of a power saving mode to the best extent possible.

In Japanese Patent Application Laid-Open No. 2005-78197 and Japanese Patent Application Laid-Open No. 2007-25882, an image forming apparatus prepares a power source for a power saving mode, supplies power only to a main storage device in the power saving mode, and holds only main programs and necessary data in the main storage device to allow it to suppress power consumption in the power saving mode and return at a high speed while decreasing power consumption in the power saving mode.

On the other hand, with an increase in kinds of functions and a speedup of a semiconductor, power needed during standby and operation of an image forming apparatus has increased more and more, and a load of a power source (main power source) that normally operates the mage forming apparatus is continually increases, year after year. Accordingly, the function of the image forming apparatus is built upon the main power source.

Japanese Patent Application Laid-Open No. 2002-318624 discusses a technique in which if an abnormality occurs in a main power source, the abnormal state of the main power source is detected, abnormality information is stored in a nonvolatile memory, and control is executed from the nonvolatile memory so as not to turn on the power source after the next operation. Further, a technique is also discussed in which the main power source is similarly switched to an auxiliary main power source and the operation is continued.

However, in a configuration in which a conventional user interface (UI) receives power from a main power source, when the abnormality occurs in the main power source, the UI cannot be used. There are no measures to determine an error, and a user cannot grasp the state of the apparatus. Hence, it is difficult to determine a failure part. Further, if the UI continuously receives power from a sub power source, increase of the power supply capacity of the sub power source is needed and a cost is also increased. Furthermore, when the auxiliary main power source is prepared, the cost is further increased.

SUMMARY OF THE INVENTION

According to an aspect of the present invention, an image forming apparatus, which operates in a normal mode or a power saving mode, includes a user interface, a first supply unit configured to supply power in the power saving mode, a second supply unit configured to supply power in the normal mode and supply no power in the power saving mode, a detection unit configured to detect abnormality of the second supply unit, and a control unit configured to perform control to supply power from the second supply unit to the user interface when the detection unit does not detect abnormality of the second supply unit and to start power supply from the first supply unit to the user interface when the detection unit detects abnormality of the second supply unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
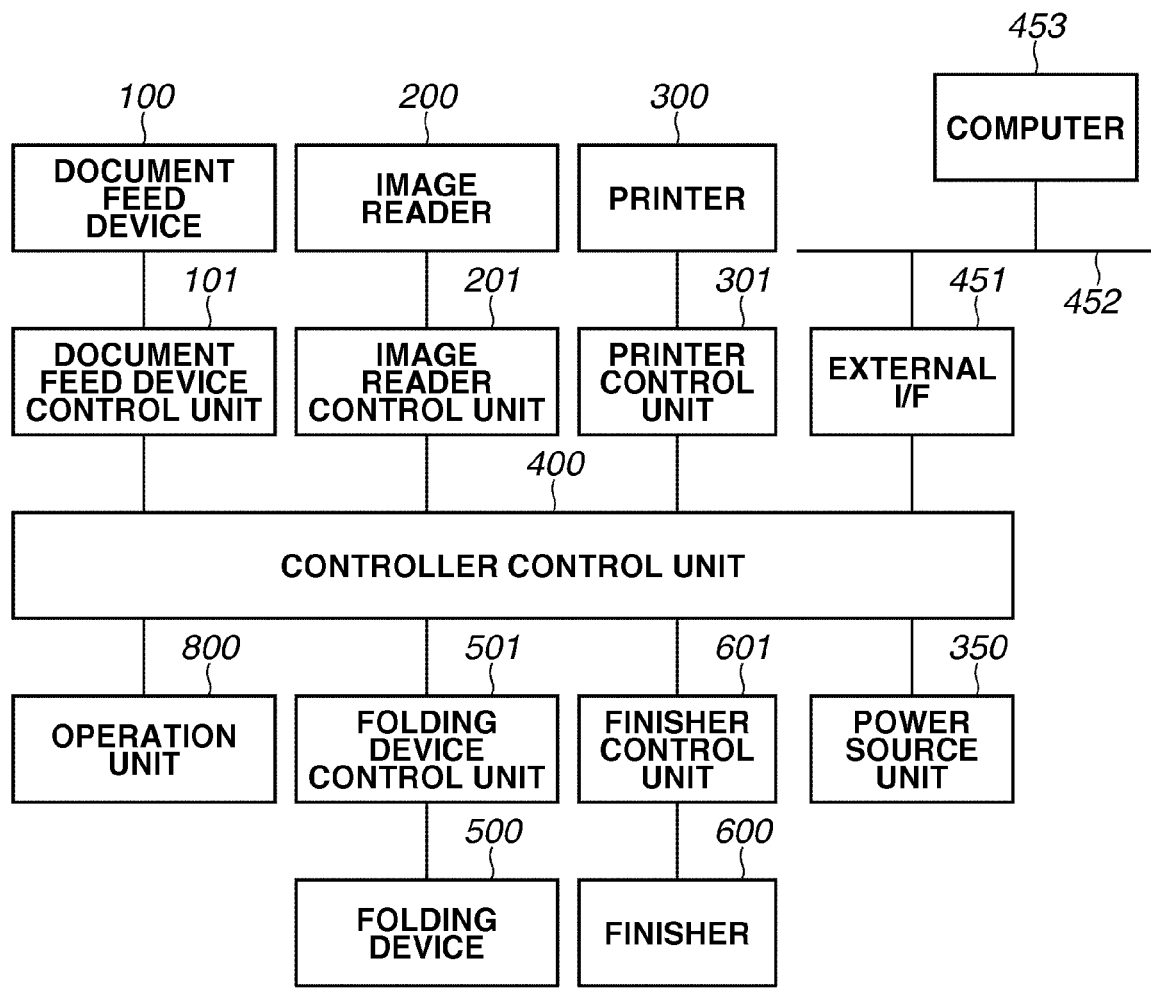
FIG. 1 is a block diagram illustrating an example of the configuration of an image forming apparatus according to a first exemplary embodiment of the present invention.

FIG. 1 is a block diagram illustrating an example of the configuration of an image forming apparatus according to a first exemplary embodiment of the present invention. The image forming apparatus according to the present exemplary embodiment includes an image reader unit 200, an image forming apparatus main body having a printer unit 300, a folding device 500, and a finisher 600. Further, on the image reader unit 200, a document feed device 100 is mounted.

The document feed device 100 supplies a document set on a document tray one by one successively from the head page and feeds it onto a platen glass of the image reader unit 200.

The image reader unit 200 reads an image on the document fed onto the platen glass. The image data on the document read by the image reader unit 200 is subjected to image processing, stored in a hard disk 407 (refer to FIG. 3) in a controller control unit 400, and also transmitted to the printer unit 300 via a printer control unit 301. The printer unit 300 executes printing processing on a sheet based on this image data and discharges it.

The sheet discharged from the printer unit 300 is sent into the folding device 500. The folding device 500 executes processing to fold the sheet into a Z shape. When the folding processing is designated, the sheet is sent into the finisher 600 after the folding processing is executed in the folding device 500. However, a sheet other than the sheet with that size is sent into the finisher 600 as it is. The finisher 600 executes processing such as bookbinding, stitching, and boring.

A controller control unit 400 communicates with the image reader unit 200, the printer unit 300, the folding device 500, the finisher 600, and the like. The controller control unit 400 manages control of the whole image forming apparatus. A power source unit 350 is a power source of the whole image forming apparatus. The power source unit 350 supplies power to the image reader unit 200, the printer unit 300, the folding device 500, and the finisher 600 under control of the controller control unit 400. The folding device 500 and the finisher 600 may also independently possess a power source.

A document feed device control unit 101 controls the document feed device 100 by instructions from the controller control unit 400. An image reader control unit 201 controls the image reader unit 200 by instructions from the controller control unit 400.

The controller control unit 400 communicates with the document feed device control unit 101 and the image reader control unit 201 based on settings by an operation unit (user interface) 800 and instructions from an external computer 453 to acquire image data of a document to be input.

Further, the controller control unit 400 communicates with the printer control unit 301 configured to control the printer unit 300 to print the image data on a sheet. Furthermore, the controller control unit 400 communicates with a folding device control unit 501 configured to control the folding device 500 and a finisher control unit 601 configured to control the finisher 600 to realize desired output such as a staple or a punched bore on the printed sheet.

An external interface (I/F) 451 is an interface to connect with the external computer 453. The external I/F 451 can rasterize print data from the external computer 453 into image data via an external bus 452 such as, for example, a network and a universal serial bus (USB) to output it. The external I/F 451 can transmit image data in the hard disk (refer to FIG. 3) to the external computer 453. The controller control unit 400 detects abnormality of power source control of the power source unit 350 from the power source unit 350 to realize each power saving mode.

Figure 2:
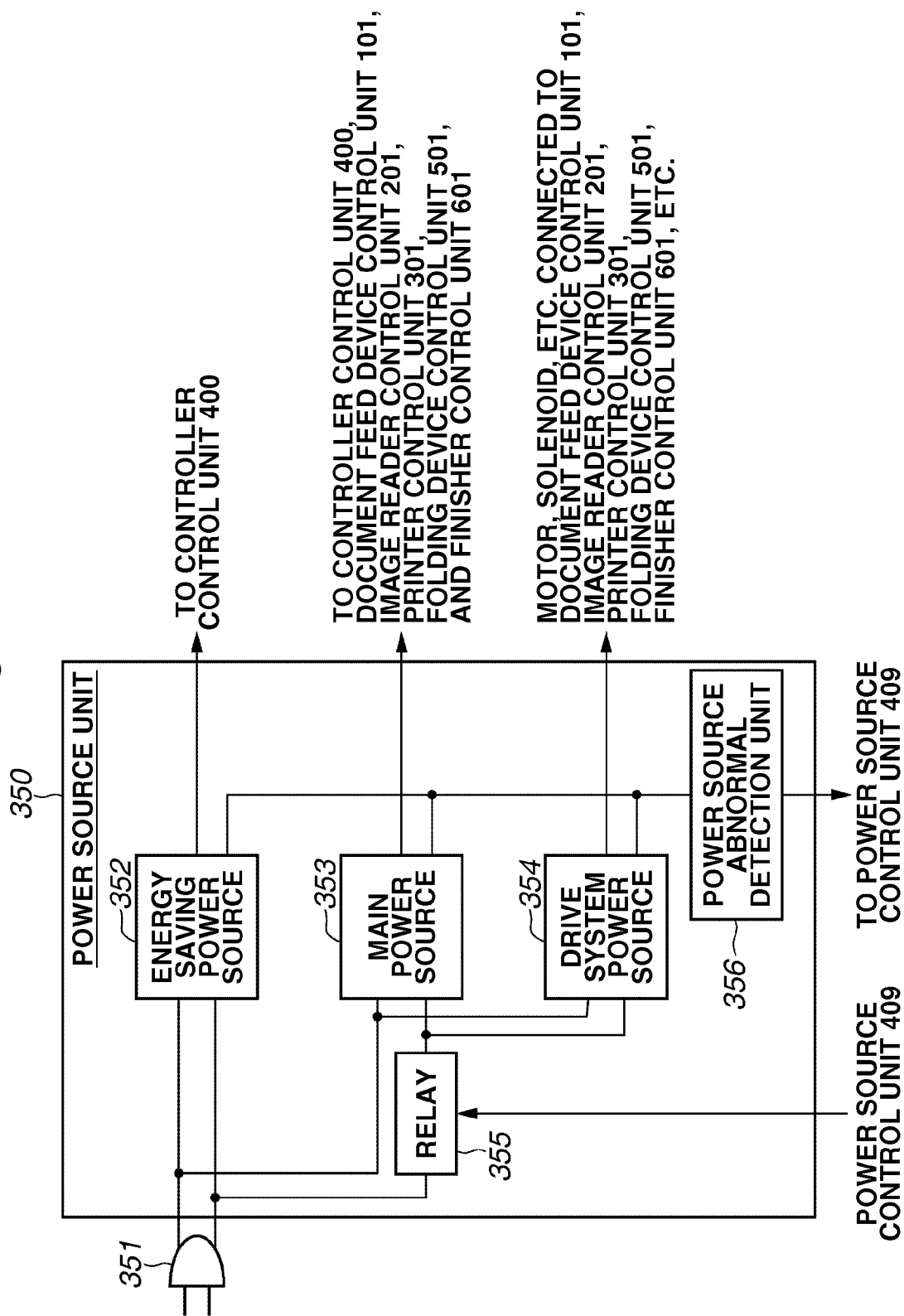
FIG. 2 is a block diagram illustrating the configuration of a power source unit.

FIG. 2 is a block diagram illustrating the configuration of the power source unit 350. As illustrated in FIG. 2, the power source unit 350 creates a direct current (DC) power source from an alternating current (AC) power source 351, and supplies power to each control unit. The power source unit 350 includes an energy saving power source 352, a main power source 353, and a drive system power source 354.

The energy saving power source 352 supplies power to the controller control unit 400 even in a power saving mode. More particularly, the energy saving power source 352 supplies power in both modes of a power saving mode and a normal mode. The main power source 353 supplies power to a central processing unit (CPU), a random access memory (RAM), and the like which manage control in the controller control unit 400, the document feed device control unit 101, the image reader control unit 201, the printer control unit 301, the folding device control unit 501, the finisher control unit 601, and each control unit in the operation unit 800. The drive system power source 354 supplies power to a motor, a solenoid, a fixing unit necessary for image formation, and the like (not illustrated) to be connected to each control unit such as the document feed device control unit 101, the image reader control unit 201, the printer control unit 301, the folding device control unit 501, and the finisher control unit 601. In the power saving mode, power supply of the main power source 353 and the drive system power source 354 is blocked. More particularly, the power source of the image forming apparatus in the present exemplary embodiment includes a first power supply unit (energy saving power source 352) configured to execute power supply even in the power saving mode and a second power supply unit (main power source 353 and drive system power source 354) configured to block power supply in the power saving mode.

A power source abnormality detection unit 356 monitors abnormality of each power source (energy saving power source 352, main power source 353, and drive system power source 354). When the abnormality is present, the power source abnormality detection unit 356 notifies a power source control unit 409 (refer to FIG. 3) in the controller control unit 400 thereof. The power source control unit 409 in the controller control unit 400 controls ON/OFF of a relay 355. The power source control unit 409 turns on the relay 355 in the case of the normal mode. With the relay 355 turned on, power is supplied to the main power source 353 and the drive system power source 354. Further, the power source control unit 409 turns off the relay 355 when a notification that the abnormality is present is received from the power source abnormality detection unit 356 or in the power saving mode. When the relay 355 is turned off, power supply to the main power source 353 and the drive system power source 354 is blocked.

Figure 3:
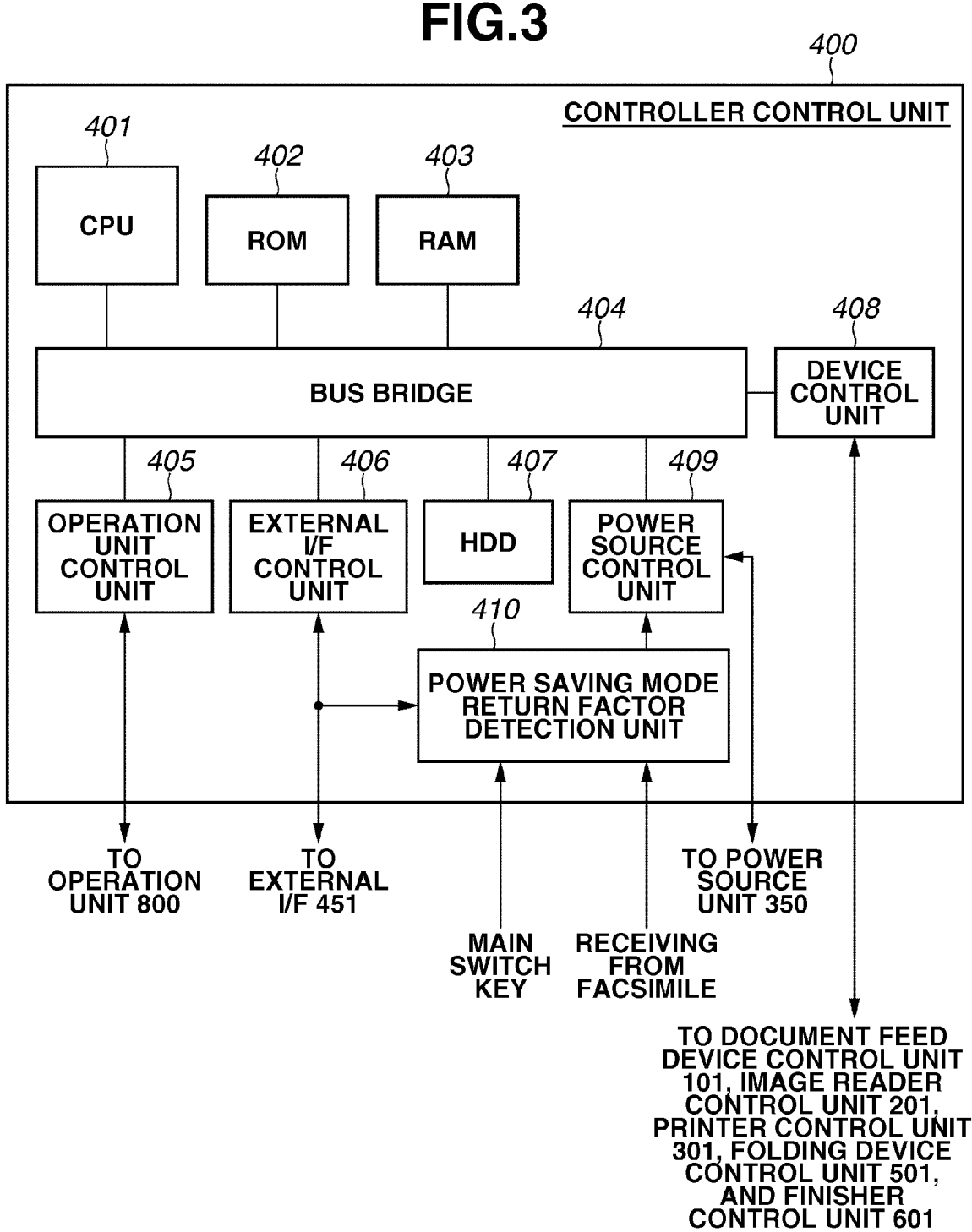
FIG. 3 is a block diagram illustrating an example of the configuration of a controller control unit.

FIG. 3 is a block diagram illustrating an example of the configuration of the controller control unit 400. In the controller control unit 400, a CPU 401, a read-only memory (ROM) 402, a RAM 403, an operation unit control unit 405, an external I/F control unit 406, a hard disk (hereinafter, referred to as HDD) 407, the power source control unit 409, a device control unit 408, and the like are connected via a bus bridge 404.

The CPU 401 can communicate with the ROM 402, the RAM 403, the operation unit control unit 405, the external I/F control unit 406, the HDD 407, the power source control unit 409, the device control unit 408, and the like via the bus bridge 404. The CPU 401 can execute various programs stored in the ROM 402, the HDD 407, or the like.

The ROM 402 stores an initial start program of the CPU 401. The RAM 403 temporarily holds control data for the CPU 401. The RAM 403 is used as a work area of calculation associated with the control. The device control unit 408 is connected with the document feed device control unit 101, the image reader control unit 201, the printer control unit 301, the folding device control unit 501, and the finisher control unit 601 to manage control of each control unit.

The operation unit control unit 405 controls the operation unit 800. The external I/F control unit 406 controls a connection with a network. The HDD 407 is used for storage of a main program and an application program, and preservation of acquired image data and an image edited in the operation unit 800 which will be described below.

The power source control unit 409 is configured to control a power source of the whole image forming apparatus. The power source control unit 409 is connected with the power source unit 350. The power source control unit 409 realizes the power source control of the document feed device control unit 101, the image reader control unit 201, the printer control unit 301, the folding device control unit 501, and the finisher control unit 601; also the power source control to the power saving mode is realized by the power source control unit 409. Further, the power source control unit 409 controls the power source also when a notification of abnormality detection is received from the power source unit 350.

The controller control unit 400 includes a power saving mode return factor detection unit 410 configured to detect a return factor (factor required to shift from power saving mode to standby state where image forming apparatus is operable) from the power saving mode. The return factor from the power saving mode includes, for example, press of a main switch key (hereinafter, referred to as main SW key) on the operation unit 800, input of a job of print from a network, and reception input from a facsimile (FAX) (not illustrated). When the return factor from the power saving mode is detected in a case where the image forming apparatus is in the power saving mode, the power saving mode return factor detection unit 410 notifies the power source control unit 409 thereof. In response to this notification, the power source control unit 409 turns on the relay 355 on the power source unit 350, thereby returning the image forming apparatus from the power saving mode.

Figure 4:
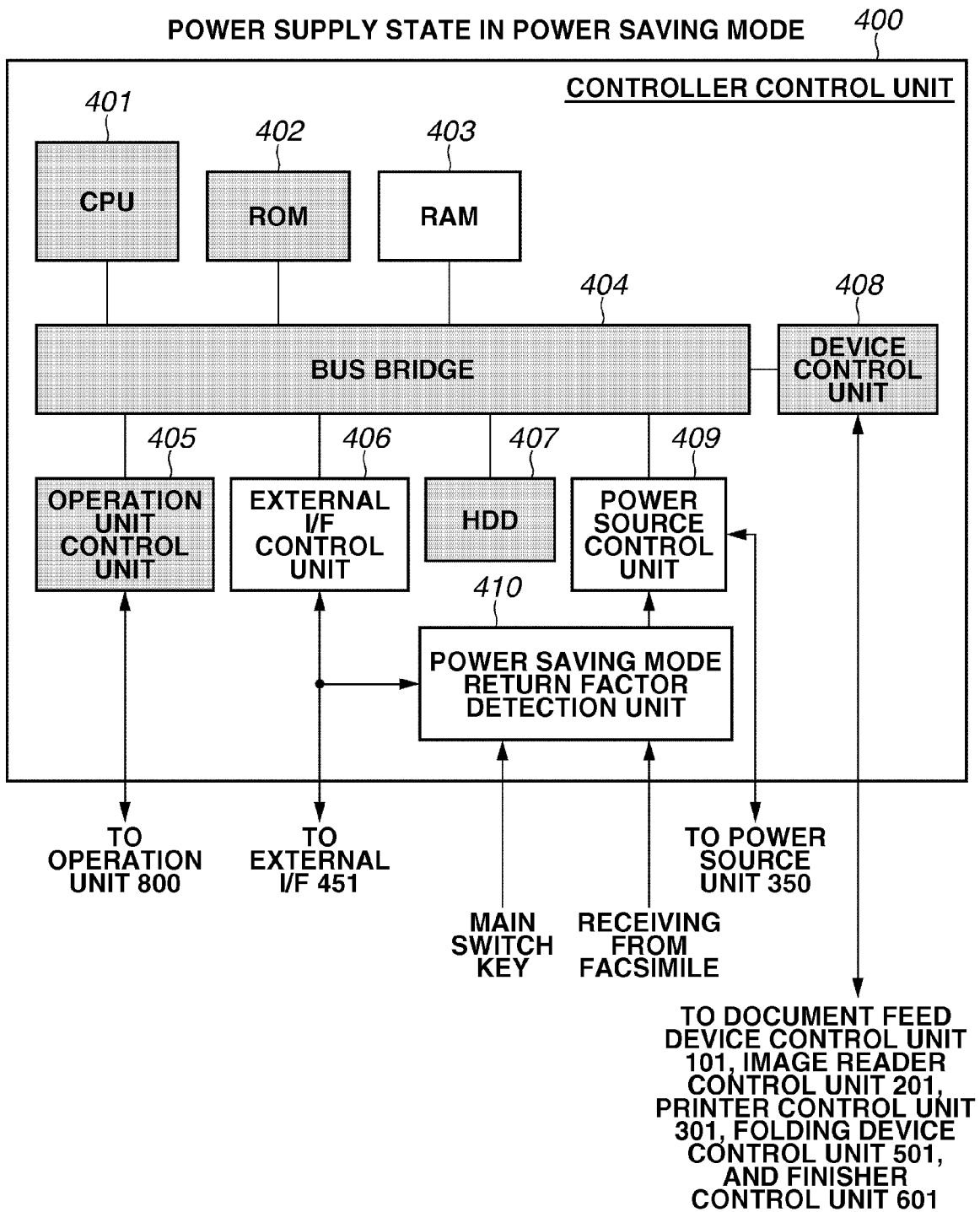
FIG. 4 is a block diagram illustrating a power supply state in a controller control unit for realizing a power saving mode of an image forming apparatus.

FIG. 4 is a block diagram illustrating a power supply state in the controller control unit 400 for realizing a power saving mode of an image forming apparatus. In the power saving mode, by the controller control unit 400, power is supplied to the RAM 403 as a main storage device (main memory); and only the setting of the CPU 401, the main program, and the necessary data are held in the main storage device. Then, when the return factor from the power saving mode is detected, each unit on the controller control unit 400 is supplied with power to cause activation.

The controller control unit 400 is supplied with power from the energy saving power source 352 and the main power source 353. From the energy saving power source 352, only power necessary in the power saving mode is supplied to the controller control unit 400. The energy saving power source 352 supplies power to the RAM 403, the external I/F control unit 406, the power source control unit 409, the power saving mode return factor detection unit 410, the main SW key (not illustrated) on the operation unit 800 which is a return factor, a FAX receiving circuit (not illustrated), and the like. In other words, the energy saving power source 352 supplies power to a portion where shading is not provided in FIG. 4.

On the other hand, the CPU 401, the ROM 402, the bus bridge 404, the operation unit control unit 405, the HDD 407, the device control unit 408, and the operation unit 800 (other than main SW), which are shaded in FIG. 4 are supplied with power from the main power source 353 but are not supplied with power from the energy saving power source 352. In the power saving mode, such a configuration allows the controller control unit 400 to realize a power saving state (energy saving state) where the least power is required.

When returning from the power saving mode, the relay 355 in the power source unit 350 is turned on by the power source control unit 409. Thus, power is supplied to each unit in the controller control unit 400. On the operation unit 800, an energy saving key (not illustrated) is provided. This energy saving key is used for shift and return to the power saving mode. In the present exemplary embodiment, the main SW key on the operation unit 800 corresponds to the energy saving key.

Error display processing in case of power source abnormality of an image forming apparatus of the present invention will be described below. When the main power source 353 is in a state of abnormality and power cannot be supplied, or abnormality occurs in a fan for cooling the power source or the like, the CPU 401 in the controller control unit 400 cannot be operated. Thus, the image forming apparatus cannot be operated.

Figure 5:
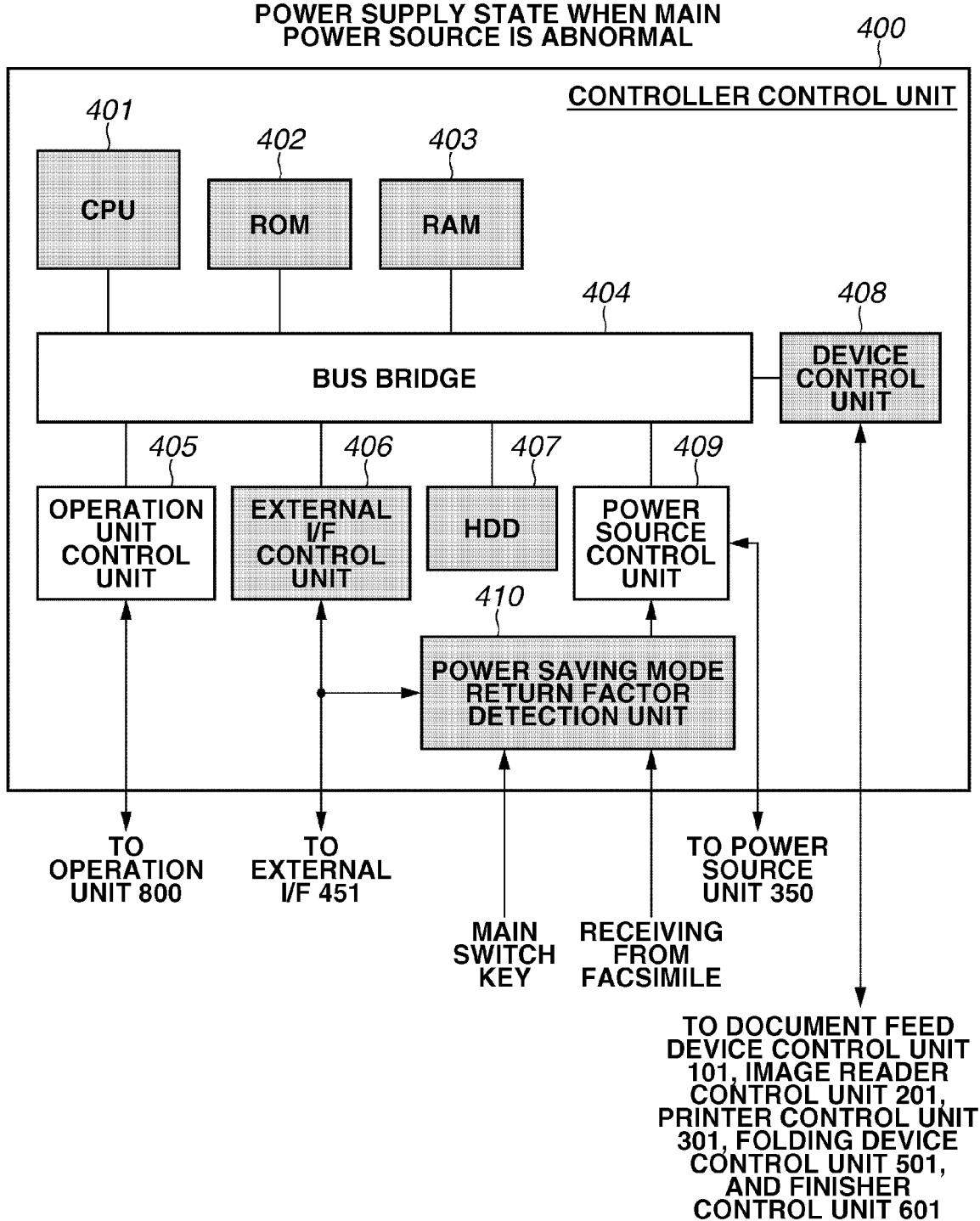
FIG. 5 is a block diagram illustrating a power supply state of a controller control unit when a main power source on an image forming apparatus according to a first exemplary embodiment is in an abnormal state.

When the power source control unit 409 receives a notification that abnormality of the main power source 353 is detected from the power source abnormality detection unit 356 in the power source unit 350, the power source control unit 409 turns off the relay 355 and also switches power supplied from the energy saving power source 352 in the controller control unit 400 as illustrated in FIG. 5.

FIG. 5 is a block diagram illustrating a power supply state of the controller control unit 400 when the main power source 353 on an image forming apparatus according to the first exemplary embodiment is in a state of abnormality. When abnormality is detected in the main power source 353, the power source control unit 409 performs control not to supply power to the shaded part in FIG. 5, and supply power only to the power source control unit 409, the bus bridge 404, the operation unit control unit 405, and a display unit 900 (refer to FIG. 6) on the operation unit 800. In the operation unit 800, power may also be supplied not only to the display unit 900 but also to the entire operation unit 800.

When the main power source 353 is in a state of abnormality, the power source control unit 409 executes error display such as, for example, "Error! Main power source is abnormal. Get in contact with serviceman." An error code or the like may also be displayed.

Figure 6:
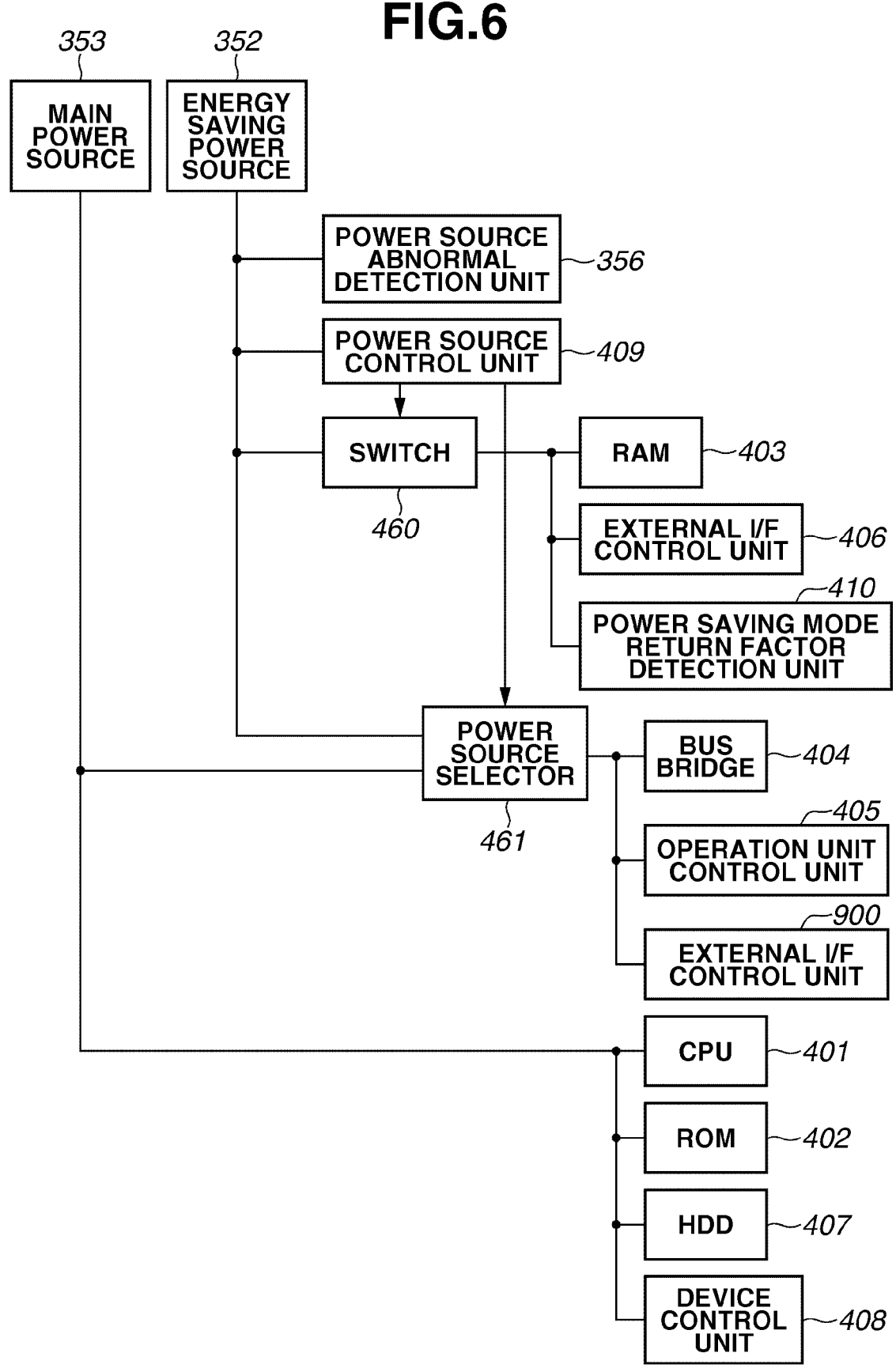
FIG. 6 is a power source system diagram illustrating an example of a power source system of an image forming apparatus according to a first exemplary embodiment.

FIG. 6 is a power source system diagram illustrating an example of a power source system of an image forming apparatus according to the first exemplary embodiment. Power is continuously supplied from the energy saving power source 352 to the power source abnormality detection unit 356 and the power source control unit 409. To realize the power saving mode, power is supplied from the energy saving power source 352 to some specific devices (RAM 403, external I/F control unit 406, and power saving mode return factor detection unit 410) in the controller control unit 400. These specific devices are configured to block or connect the energy saving power source 352 with a switch 460. The power source control unit 409 executes switching control of this switch 460.

A power source selector 461 is configured to select (switch) the energy saving power source 352 or the main power source 353 as a power supply source of the bus bridge 404, the operation unit control unit 405, and the display unit 900. Normally (when main power source abnormality is not detected by power source abnormality detection unit), power supply to the bus bridge 404, the operation unit control unit 405, and the display unit 900 is executed from the main power source 353. However, by switching the power source selector 461, the power supply source is switched from the main power source 353 to the energy saving power source 352. Thus, power supply from the energy saving power source 352 to the bus bridge 404, the operation unit control unit 405, and the display unit 900 is started. The power source control unit 409 controls switching of this power source selector 461.

The CPU 401, the ROM 402, the HDD 407, and the device control unit 408 are supplied with power only from the main power source 353. A control signal may be output to the switch 460 and the power source selector 461 from the power source control unit 409 and the power source is switched by a field effect transistor (FET), and other method may also be used.

Figure 7:
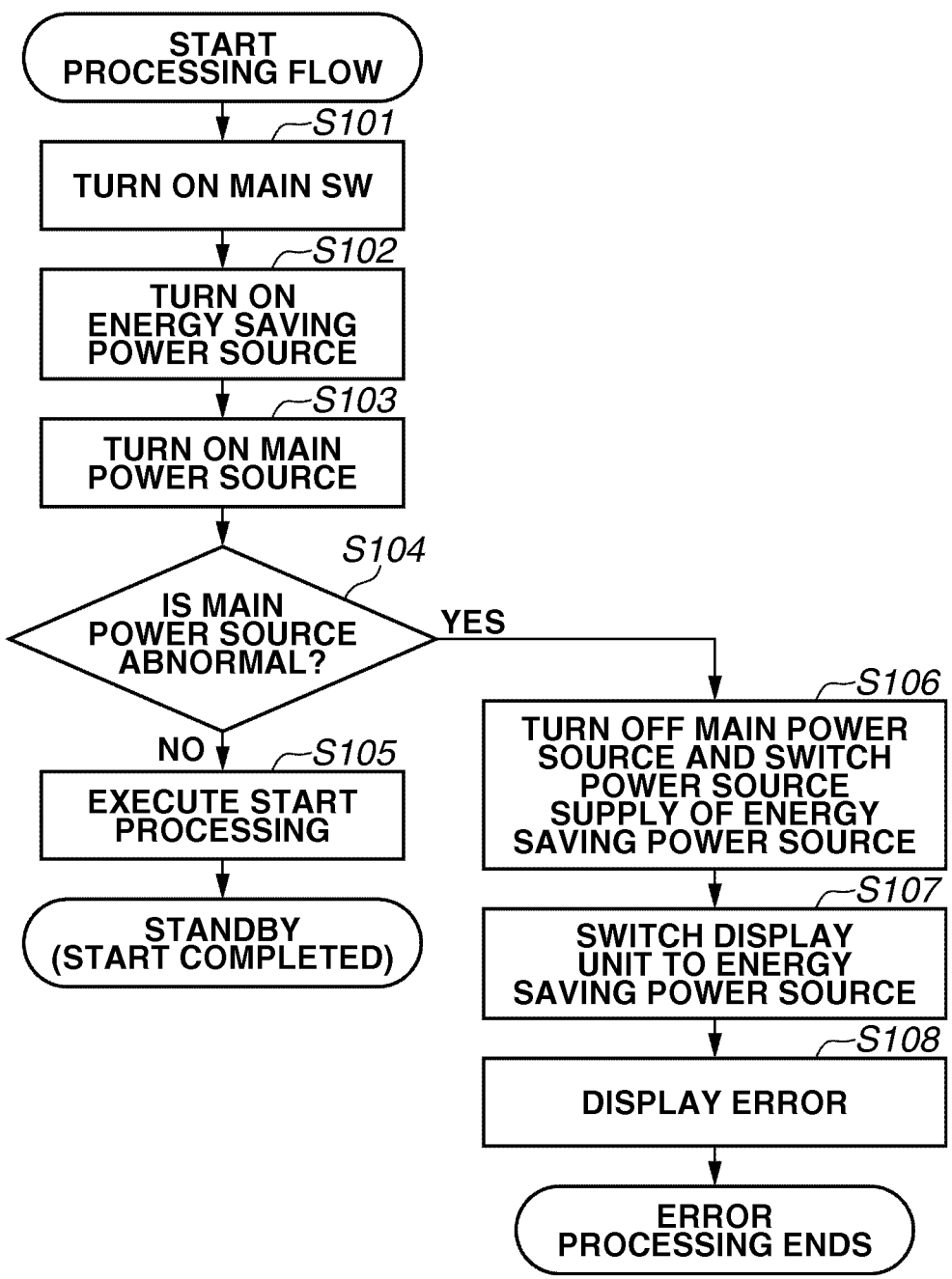
FIG. 7 is a flowchart illustrating an example of start processing to detect power source abnormality of an image forming apparatus according to a first exemplary embodiment.

FIG. 7 is a flowchart illustrating an example of start processing to detect power source abnormality of an image forming apparatus according to the first exemplary embodiment. First, in step S101, when a main switch (not illustrated) on the image forming apparatus is turned on, in step S102, an energy saving power source is input from the energy saving power source 352. When power is normally supplied from the energy saving power source 352, the power source control unit 409 is started. The power source control unit 409 executes the following steps S104 and S106 to S108. The processing of the power source control unit 409 may be executed by hardware or may also be executed by causing the power source control unit 409 to read software (program) stored in a flash memory provided on the power source control unit 409 to execute it. Further, the processing in step S105 is executed by causing the CPU 401 to read a program recorded on the ROM 402 or the HDD 407 to execute it.

In step S103, in order to supply power from the main power source 353 and the drive system power source 354, the power source control unit 409 turns on the relay 355 and turns on the main power source 353. In step S104, when the main power source is turned on, the power source control unit 409 monitors whether abnormality is present in the main power source 353 using a signal from the power source abnormality detection unit 356. When it is determined that the abnormality of the main power source 353 is not detected by the power source abnormality detection unit 356 (NO in step S104), the power source control unit 409 performs control to continue power supply from the main power source 353. Then, in step S105, the CPU 401 executes start processing of the image forming apparatus. The processing proceeds to a standby state (a printable state). Then, the start processing is completed.

On the other hand, when it is determined that the abnormality of the main power source 353 is detected by the power source abnormality detection unit 356 (YES in step S104), the power source control unit 409 advances the processing to step S106. In step S106, in order to turn off the main power source 353, the power source control unit 409 turns off the relay 355. Further, in step S106, the power source control unit 409 turns off the relay 355 and simultaneously performs control to switch power, which is supplied from the energy saving power source 352 into the controller control unit 400, from a power supply state illustrated in FIG. 4 to a power supply state illustrated in FIG. 5.

Next, in step S107, the power source control unit 409 operates the power source selector 461 to switch the power supply source of the display unit 900 to the energy saving power source 352. In step S108, the power source control unit 409 executes error display on the display unit 900. Then, the error processing ends. The error display in step S108 is, for example, "error! Main power source is abnormal. Get in contact with serviceman."

Figure 8:
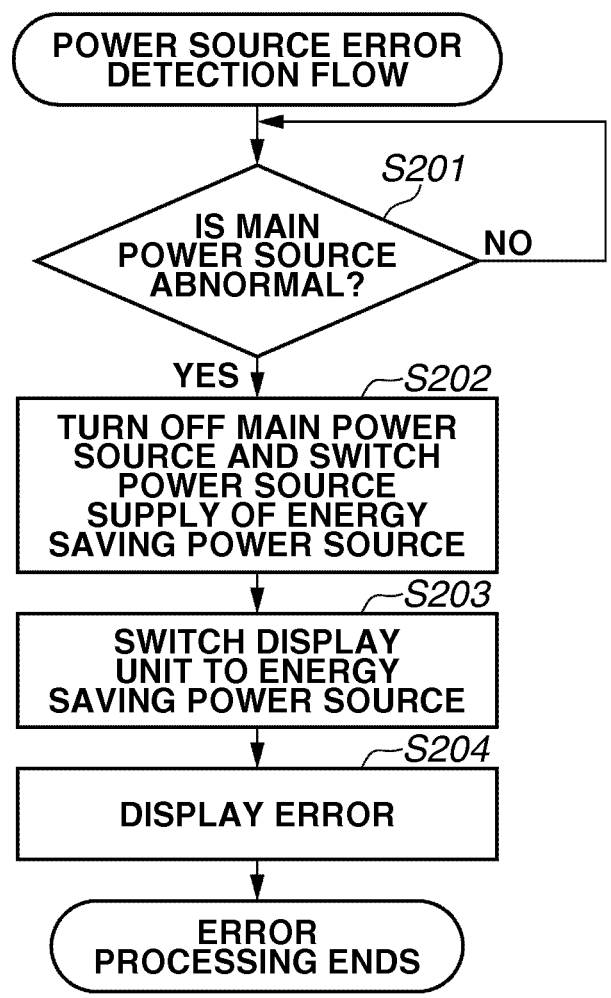
FIG. 8 is a flowchart illustrating an example of processing to detect power source abnormality during standby or operation of an image forming apparatus according to a first exemplary embodiment.

FIG. 8 is a flowchart illustrating an example of processing to detect power source abnormality during standby or operation of an image forming apparatus according to the first exemplary embodiment. The processing in this flowchart is executed by the power source control unit 409. The processing of the power source control unit 409 may be executed by hardware or may also be executed by causing the power source control unit 409 to read software (program) stored in a flash memory provided on the power source control unit 409 to execute it.

In step S201, during standby or operation of the image forming apparatus, the power source control unit 409 monitors whether abnormality is present in the main power source 353 using a signal from the power source abnormality detection unit 356. When it is determined that abnormality of the main power source 353 is not detected by the power source abnormality detection unit 356 (NO in step S201), the power source control unit 409 continues monitoring. Then, when it is determined that abnormality of the main power source 353 is detected by the power source abnormality detection unit 356 (YES in step S201), in order to turn off the main power source 353, the power source control unit 409 turns off the relay 355. Further, in step S202, the power source control unit 409 turns off the relay 355 and simultaneously performs control to switch power, which is supplied from the energy saving power source 352 in the controller control unit 400, from a power supply state illustrated in FIG. 4 to a power supply state illustrated in FIG. 5.

Next, in step S203, the power source control unit 409 operates the power source selector 461 to switch the power supply source of the display unit 900 to the energy saving power source 352. In step S204, the power source control unit 409 executes error display similar to that in step S108 illustrated in FIG. 7 on the display unit 900. Then, the error processing ends.

In the present exemplary embodiment, when abnormality occurs in the main power source 353, power supply to specific devices to which power is supplied from the energy saving power source 352 (RAM 403, external I/F control unit 406, and power saving mode return factor detection unit 410) is blocked. Then, the power supply source of the display unit 900 is switched to the energy saving power source 352 to start power supply from the energy saving power source 352 to the display unit 900. Accordingly, with a load to the energy saving power source 352 suppressed, power can be supplied from the energy saving power source 352 to the display unit 900. Therefore, even when abnormality occurs in the main power source 353, the image forming apparatus capable of executing error display using the UI (display unit on operation unit 800) can be realized without changing (increasing) power supply capacity of the sub power source (energy saving power source 352).

Error transmission/display processing in case of power source abnormality of an image forming apparatus according to a second exemplary embodiment will be described below. When the main power source 353 is in a state of abnormality and power cannot be supplied, or abnormality occurs in a fan for cooling a power source or the like, the CPU 401 in the controller control unit 400 cannot be operated. Thus, the image forming apparatus cannot be operated.

Figure 9:
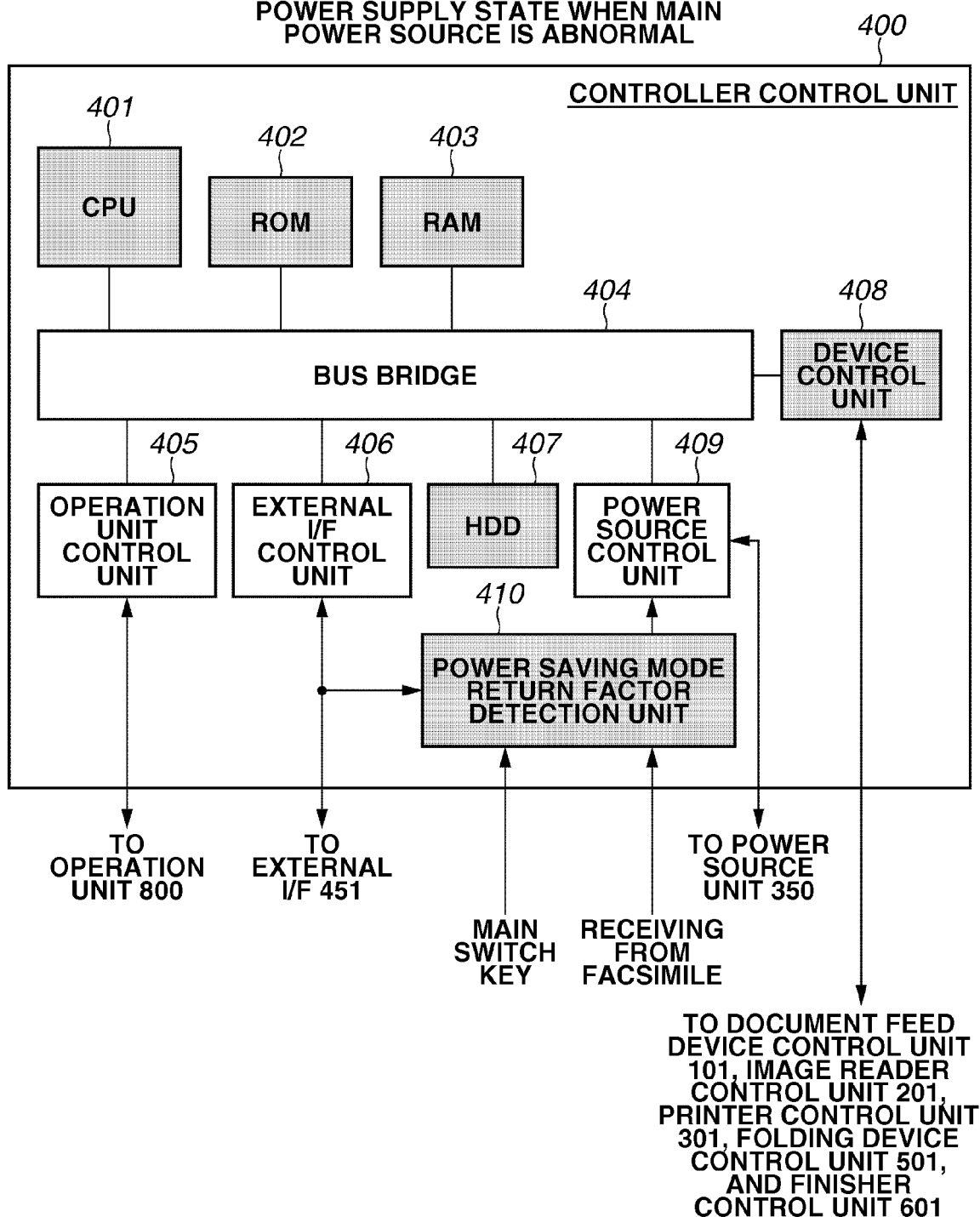
FIG. 9 is a block diagram illustrating a power supply state of a controller control unit when a main power source on an image forming apparatus according to a second exemplary embodiment is in an abnormal state.

When the power source control unit 409 receives a notification that abnormality of the main power source 353 is detected from the power source abnormality detection unit 356 in the power source unit 350, the power source control unit 409 turns off the relay 355 and also switches power to be supplied from the energy saving power source 352 in the controller control unit 400 as illustrated in FIG. 9.

FIG. 9 is a block diagram illustrating a power supply state of the controller control unit 400 when the main power source 353 on the image forming apparatus according to the second exemplary embodiment is in an abnormal state. When abnormality is detected in the main power source 353, the power source control unit 409 performs control to supply power to the shaded part in FIG. 9. In this case, the power source control unit 409 performs control to supply power only to the power source control unit 409, the bus bridge 404, the operation unit control unit 405, the display unit (not illustrated) on the operation unit 800, and the external I/F control unit 406. The operation unit 800 may also be configured not to supply power only to the display unit but to the whole operation unit 800.

Further, when the main power source 353 is in a state of abnormality, the power source control unit 409 transmits error information from the external I/F control unit 406 to a preset notification address such as, for example, an apparatus to monitor an error of the image forming apparatus via the external I/F 451. Further, when the error information is transmitted, at the same time the power source control unit 409 executes error display on the display unit on the operation unit 800. The error display is, for example, "Error! Main power source is abnormal. Error information has been transmitted. Confirm to serviceman." The above-described preset notification address is an internet protocol (IP) address, a mail address, a uniform resource locator (URL), or the like on a server, a personal computer (PC), or the like registered on a flash memory or the like provided on the power source control unit 409 by a user, a serviceman, or the like in advance.

Figure 10:
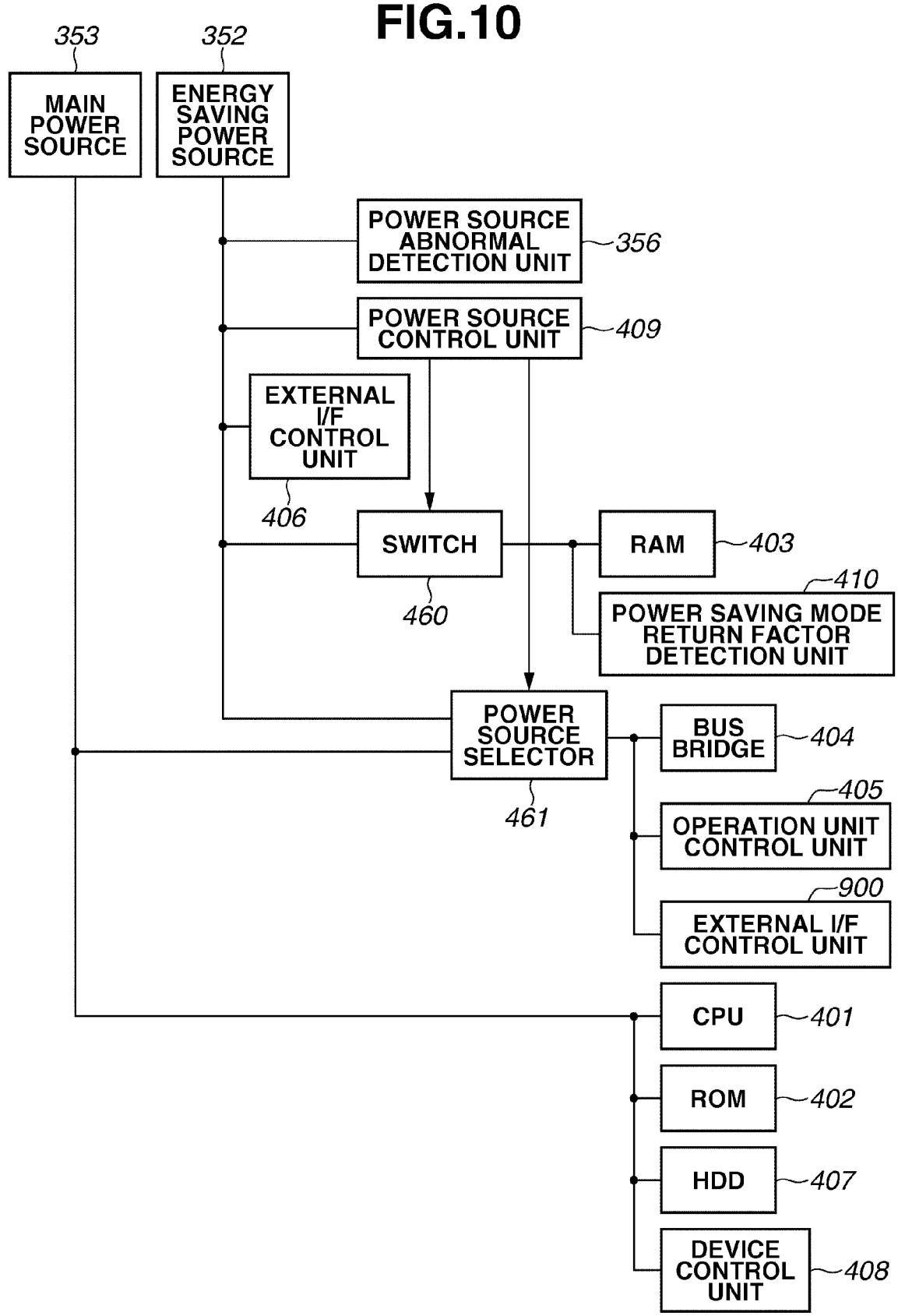
FIG. 10 is a power source system diagram illustrating an example of a power source system of an image forming apparatus according to a second exemplary embodiment.

FIG. 10 is a power system diagram illustrating an example of a power source system of the image forming apparatus according to the second exemplary embodiment. The power is continuously supplied from the energy saving power source 352 to the power source abnormality detection unit 356, the external I/F control unit 406, and the power source control unit 409. In order to realize a power saving mode, power is supplied from the energy saving power source 352 to the RAM 403 and the power saving mode return factor detection unit 410. These are configured so as to block or connect with the switch 460. The power source control unit 409 executes switching control of this switch 460.

The bus bridge 404, the operation unit control unit 405, and the display unit on the operation unit 800 are configured to allow the power source selector 461 to select the energy saving power source 352 or the main power source 353. The switching control of this power source selector 461 is executed by the power source control unit 409. The CPU 401, the ROM 402, the HDD 407, and the device control unit 408 are supplied with power only from the main power source 353. In the switch 460 and the power source selector 461, a control signal is output by the power source control unit 409 and the power source is switched by the FET may be used. However, other method may also be used.

As illustrated in FIGS. 9 and 10, in the present exemplary embodiment, the external I/F control unit 406 uses the energy saving power source 352 as the power supply source. The external I/F control unit 406 is configured such that power supply from the energy saving power source 352 is retained even when abnormality of the main power source 353 is detected by the power source abnormality detection unit 356.

Figure 11:
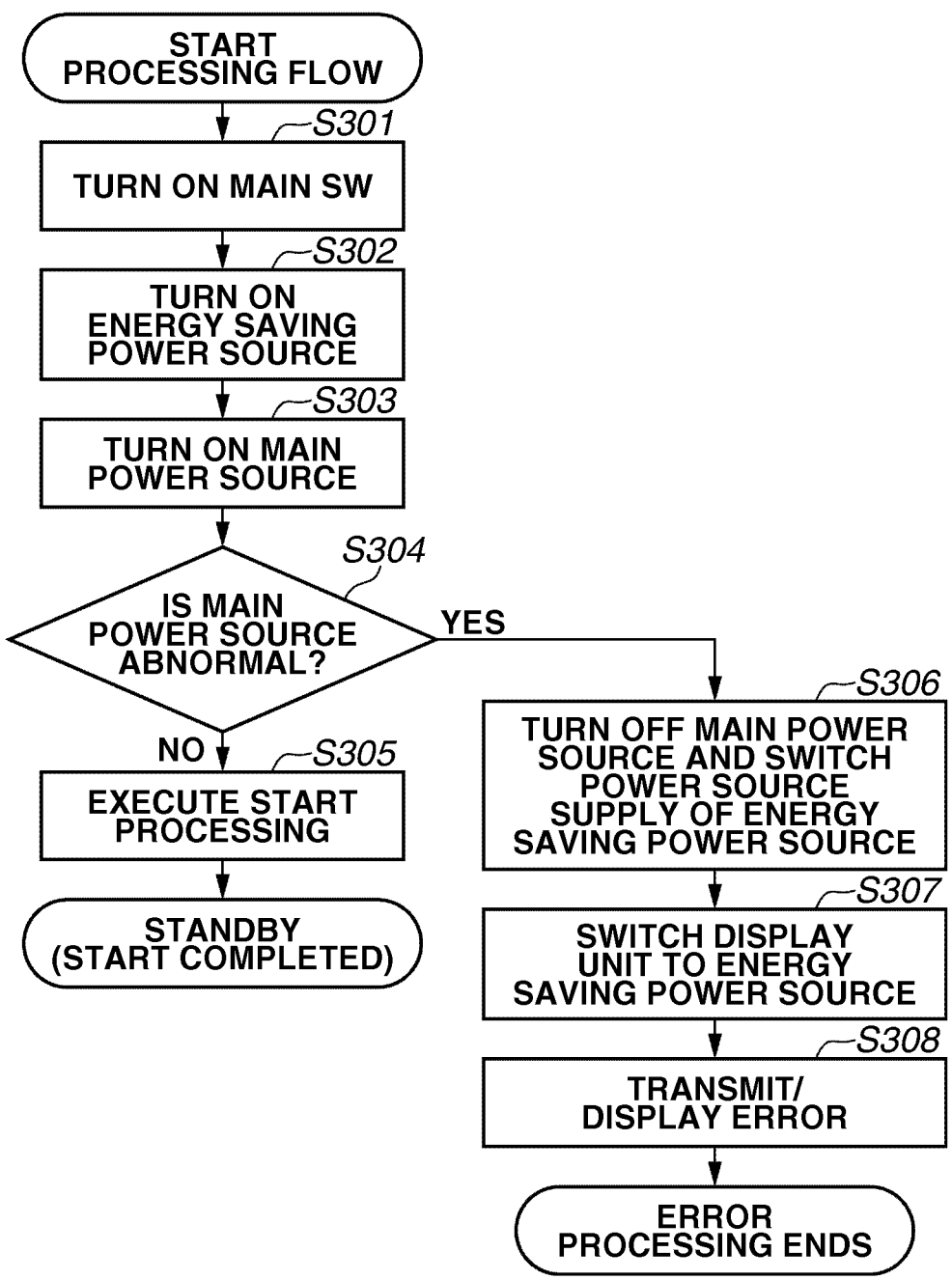
FIG. 11 is a flowchart illustrating an example of start processing to detect power source abnormality of an image forming apparatus according to a second exemplary embodiment.

FIG. 11 is a flowchart illustrating an example of start processing to detect power source abnormality of the image forming apparatus according to the second exemplary embodiment. First, in step S301, when a main switch (not illustrated) on an image forming apparatus is turned on, in step S302, an energy saving power source is input from the energy saving power source 352. When power is normally supplied from the energy saving power source 352, the power source control unit 409 is started. The power source control unit 409 executes the following steps S304 and S306 to S308. The processing of the power source control unit 409 may be executed by hardware or may also be executed by causing the power source control unit 409 to read software (program) stored in a flash memory provided on the power source control unit 409 to execute it. Further, the processing in step S305 is executed by causing the CPU 401 to read a program recorded on the ROM 402 and the HDD 407 to execute it.

Since the processing in steps S301 to S305 is the same as that in steps S101 to S105, the description will be omitted. When it is determined that abnormality of the main power source 353 is detected by the power source abnormality detection unit 356 (YES in step S304), in the power source control unit 409, the processing proceeds to step S306. In step S306, in order to turn off the main power source 353, the power source control unit 409 turns off the relay 355. Further, in step S306, the power source control unit 409 turns off the relay 355 and simultaneously performs control to switch power, which is supplied from the energy saving power source 352 into the controller control unit 400, from a power supply state illustrated in FIG. 4 to a power supply state illustrated in FIG. 9.

Next, in step S307, the power source control unit 409 operates the power source selector 461 to switch the power supply source of the display unit on the operation unit 800 to the energy saving power source 352. Further, in step S308, the power source control unit 409 transmits error information from the external I/F control unit 406 to a notification address registered in advance via the external I/F 451 and also executes error display on the display unit on the operation unit 800. Then, the error processing ends. The error display in step S308 is, for example, "error! Main power source is abnormal. Error information has been transmitted. Confirm to serviceman."

Figure 12:
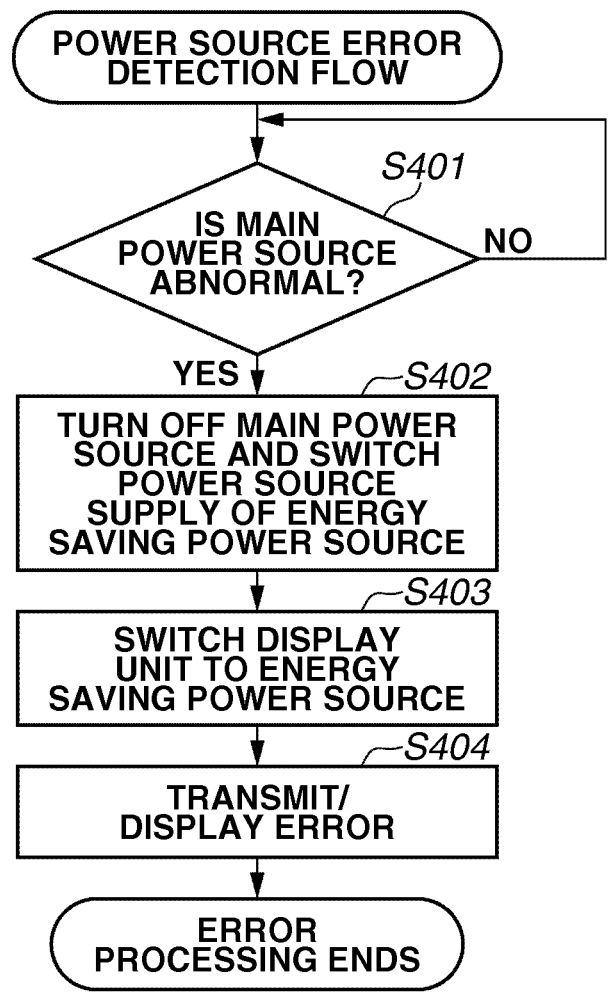
FIG. 12 is a flowchart illustrating an example of processing to detect power source abnormality during standby or operation of an image forming apparatus according to a second exemplary embodiment.

FIG. 12 is a flowchart illustrating an example of processing to detect power source abnormality during standby or operation of the image forming apparatus according to the second exemplary embodiment. The processing in this flowchart is executed by the power source control unit 409. The processing of the power source control unit 409 may be executed by hardware or may also be executed by causing the power source control unit 409 to read software (program) stored in a flash memory provided on the power source control unit 409 to execute it.

In step S401, during standby or operation of the image forming apparatus, the power source control unit 409 monitors whether abnormality is present in the main power source 353 by a signal from the power source abnormality detection unit 356. When it is determined that abnormality of the main power source 353 is not detected by the power source abnormality detection unit 356 (NO in step S401), the power source control unit 409 continues monitoring. Then, when it is determined that abnormality of the main power source 353 is detected by the power source abnormality detection unit 356 (YES in step S401), in order to turn off the main power source 353, the power source control unit 409 turns off the relay 355. Further, in step S402, the power source control unit 409 turns off the relay 355 and simultaneously performs control to switch power, which is supplied from the energy saving power source 352 in the controller control unit 400, from a power supply state illustrated in FIG. 4 to a power supply state illustrated in FIG. 9.

Next, in step S403, the power source control unit 409 operates the power source selector 461 to switch the power supply source of the display unit on the operation unit 800 to the energy saving power source 352. Further, in step S404, the power source control unit 409 transmits error information from the external I/F control unit 406 to a notification address registered in advance via the external I/F 451 and also executes error display similar to that in step S308 illustrated in FIG. 11 on the display unit on the operation unit 800. Then, the error processing ends.

When power supply capacity of the energy saving power source 352 is low, it is configured as shown in the power source system diagram in FIG. 6. The power source control unit 409 may also be configured to transmit an error from the external I/F control unit 406 via the external I/F 451 before power supply source switching processing in step S402. In this configuration, the power source control unit 409 advances the processing to step S402 after transmission of error information. In step S402, the power source control unit 409 may block the switch 460, simultaneously switch the power source selector 461 to the energy saving power source 352, supply power to the bus bridge 404, the operation unit control unit 405 and the display unit 900, and execute error display.

According to the present exemplary embodiment, even when abnormality occurs in the main power source 353, the image forming apparatus capable of executing an error notification using the external I/F 451 and error display using the UI (display unit on operation unit 800) can be realized without changing power supply capacity of the sub power source (energy saving power source 352).

One aspect of the present invention is directed to an image forming apparatus capable of grasping error information even when the abnormality occurs in a main power source without increasing the power supply capacity of a sub power source. Each of above-described configurations is not limited to the exemplary embodiment. According to a use or a purpose, it may be realized with various configurations or contents. So far, one exemplary embodiment has been described. However, an exemplary embodiment according to the present invention can be configured as a system, an apparatus, a method, a program, a storage medium, or the like. Specifically, the present invention may also be applied to a system including a plurality of instruments or an apparatus including one instrument. Further, a configuration combining each exemplary embodiment described above is entirely included in the present invention.

OTHER EMBODIMENTS

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-110205 filed May 12, 2010, which is hereby incorporated by reference herein in its entirety.

What is claimed is:

1. An image forming apparatus which operates in a normal mode or a power saving mode comprising:
   a memory;
   a user interface;
   a first supply unit configured to supply power in the power saving mode;
   a second supply unit configured to supply power in the normal mode and supply no power in the power saving mode;
   a detection unit configured to detect abnormality of the second supply unit; and
   a control unit configured to perform control to supply power from the first supply unit to the memory and to supply power from the second supply unit to the user interface when the detection unit does not detect abnormality of the second supply unit, and, to stop power supply from the first supply unit to the memory and to start power supply from the first supply unit to the user interface, when the detection unit detects abnormality of the second supply unit.

2. The image forming apparatus according to claim 1, wherein the control unit performs control to stop power supply from the second supply unit when the detection unit detects abnormality of the second supply unit.

3. The image forming apparatus according to claim 1, wherein the user interface notifies a user of abnormality of the second supply unit when the detection unit detects abnormality of the second supply unit.

4. The image forming apparatus according to claim 1, further comprising a power saving mode return factor detection unit configured to detect a return factor from a power saving mode.

5. The image forming apparatus according to claim 1, further comprising a transmission unit configured to transmit information,
   wherein a power supply source of the transmission unit is the first supply unit and power supply from the first supply unit is maintained even when the detection unit detects abnormality of the second supply unit, and
   wherein the control unit transmits error information about the image forming apparatus using the transmission unit when the detection unit detects abnormality of the second supply unit.

6. The image forming apparatus according to claim 1, further comprising a transmission unit configured to transmit information,
   wherein a power supply source of the transmission unit is the second supply unit, and
   wherein the control unit blocks power supply from the second supply unit after error information about the image forming apparatus is transmitted using the transmission unit when the detection unit detects abnormality of the second supply unit.

7. A control method of an image forming apparatus, which operates in a normal mode or a power saving mode, including a memory, a user interface, a first supply unit configured to supply power in the power saving mode, and a second supply unit configured to supply power in the normal mode and supply no power in the power saving mode, the control method comprising:
   detecting abnormality of the second supply unit; and
   performing control to supply power from the first supply unit to the memory and to supply power from the second supply unit to the user interface when abnormality of the second supply unit is not detected, and performing control, to stop power supply from the first supply unit to the memory and start power supply from the first supply unit to the user interface, when abnormality of the second supply unit is detected.

8. The method according to claim 7, wherein power supply from the second supply unit is stopped when the abnormality of the second supply unit is detected.

9. The method according to claim 7, wherein the user interface notifies a user of abnormality of the second supply unit when the abnormality of the second supply unit is detected.

10. The method according to claim 7, further comprising detecting a return factor from a power saving mode.

11. The method according to claim 7, further comprising transmitting information using a transmission unit of the image forming apparatus,
- wherein a power supply source of the transmission unit is the first supply unit and power supply from the first supply unit is maintained even when abnormality of the second supply unit is detected, and
- wherein error information about the image forming apparatus is transmitted when the abnormality of the second supply unit is detected.

12. The method according to claim 7, wherein the image forming apparatus further comprises a transmission unit configured to transmit information,
- wherein a power supply source of the transmission unit is the second supply unit, and
- wherein power supply from the second supply unit is blocked after error information about the image forming apparatus is transmitted using the transmission unit when the abnormality of the second supply unit is detected.

* * * * *